(12) United States Patent
Liu et al.

(10) Patent No.: US 8,520,140 B2
(45) Date of Patent: Aug. 27, 2013

(54) MODE BASED FILM MODE DETECTION

(75) Inventors: Chunjuan Liu, Shanghai (CN); Tiehan Lu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 29 days.

(21) Appl. No.: 13/271,367

(22) Filed: Oct. 12, 2011

(65) Prior Publication Data

US 2013/0093949 A1    Apr. 18, 2013

(51) Int. Cl.
*H04N 7/01*    (2006.01)
(52) U.S. Cl.
USPC .......................................... 348/441
(58) Field of Classification Search
USPC .......... 348/441, 448, 669, 700, 447; 382/168
See application file for complete search history.

(56) References Cited

U.S. PATENT DOCUMENTS

| | | | |
|---|---|---|---|
| 5,734,420 A * | 3/1998 | Lee et al. | 348/97 |
| 5,767,923 A * | 6/1998 | Coleman, Jr. | 348/700 |
| 2003/0081117 A1 * | 5/2003 | Bogdanowicz et al. | 348/97 |
| 2004/0091171 A1 * | 5/2004 | Bone | 382/284 |
| 2005/0243926 A1 * | 11/2005 | Hubrich et al. | 375/240.16 |
| 2005/0259950 A1 * | 11/2005 | Landsiedel et al. | 386/46 |
| 2009/0256958 A1 * | 10/2009 | Chao | 348/452 |
| 2011/0292997 A1 * | 12/2011 | An et al. | 375/240.03 |

\* cited by examiner

*Primary Examiner* — Paulos M Natnael
(74) *Attorney, Agent, or Firm* — Ryder, Lu, Mazzeo and Konieczny, LLC; Douglas J. Ryder (57) ABSTRACT

In general, in one aspect, the frames of a received video are analyzed using traditional film mode detection (continually capturing data and comparing the data to known parameters for various film modes) until a film mode is detected. Once the film mode is detected, the frames of the received video are analyzed using mode based tracking where measurements are continually predicted based on the mode detected and averaged with actual measurements. The use of the averaged measurements limit the effect of noise captured in the actual measurements. The averaged measurements are continually compared to known parameters for the detected mode to determine if the detected mode is still valid. If the detected mode is valid, the mode based tacking is continued. If the detected mode is no longer valid (e.g., averaged measurements not correlated with known parameters), the process returns to the traditional film mode detection.

26 Claims, 5 Drawing Sheets

FIG. 1

EVEN FIELD | A | B | C | D
ODD FIELD | A | B | C | D

EVEN FIELD | A | A | B | C | D
ODD FIELD | A | B | C | C | D

MODE BASED FILM MODE DETECTION

BACKGROUND

Video is a series of frames (still images) captured in rapid succession. Video may be recorded, displayed, stored and/or transmitted by progressive scanning or interlaced scanning Progressive scanning is where all the lines of each frame are drawn in sequence. Interlaced scanning is where each frame is divided into 2 fields one containing all the even lines of the frame and one containing all the odd lines.

Television broadcasts are typically captured using interlaced scanning The rate depends on the television broadcast standard adopted. For example, the National Television System Committee (NTSC) standard is 60 fields/sec (30 frames/sec). Older cathode ray tube (CRT) displays were able to display interlaced video based on their complete analog nature. However, current displays, such as liquid crystal displays (LCD), digital light processing (DLP), and plasma are inherently digital in that the display includes discrete pixels and therefore can not display interlaced video. Accordingly, these displays need to combine the even and odd fields into a single frame for display. However, as the fields of the frame were shot at different times simply combining the images will result in various visual defects. A de-interlacing process is needed for the display to create a progressive scanning video from the interlaced video that limits the visual defects.

Motion pictures (movies) are typically captured on 24 frames (still images) per second film using progressive scanning A process known as "telecine" may have been used to convert the motion picture from the format of 24 frames per second to the 60 fields per second rate utilized by an NTSC broadcast television network. The telecine process includes repeating frames according to a certain pattern, known as a pull-down pattern, to convert the 24 frames to 60 fields. In order to present the movies on a display without affecting the quality of the original 24 progressive frames, the display needs to perform an inverse telecine operation to reverse the pull-down pattern and discard the repeated frames.

A display may receive interlaced video or video with various telecine pull-down patterns (various film modes). The display therefore needs to be capable of performing de-interlacing and inverse telecine operations. In order to know what operations need to be performed on the received video, the display needs to determine the film mode of the video. If a display incorrectly indentifies the film mode of the video, the wrong processing may be performed on the video. For example, if the display processes a telecine video as an interlaced video or processes a telecine video with the wrong inverse telecine operations the video presented on the display may have visual defects (e.g., lost detail, combing artifacts).

BRIEF DESCRIPTION OF THE DRAWINGS

The features and advantages of the various embodiments will become apparent from the following detailed description in which.

DETAILED DESCRIPTION

De-interlacing video for presentation on a display may require that one or more fields be buffered so they can be combined into full frames. De-interlacing techniques may include field combination techniques (e.g., weaving, blending) that take the even and odd fields and combine them into one frame, field extension techniques (e.g., half sizing, line doubling) that extend each field the entire screen to make a frame, and motion compensation techniques that utilize a combination of the field combination and field extension techniques.

Figure 1:
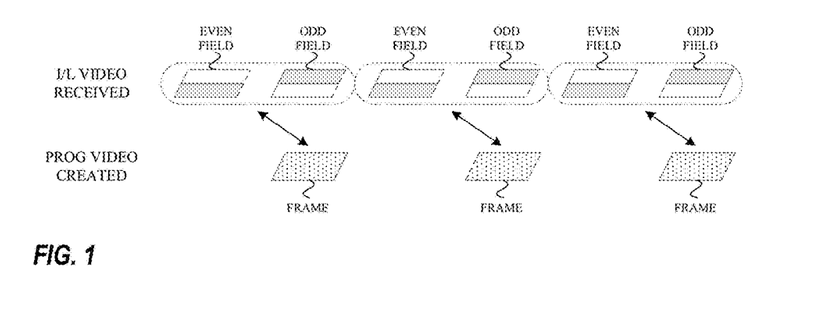
FIG. 1 illustrates an example conversion of an interlaced video received by a display to a progressive video that can be drawn on the display.

FIG. 1 illustrates an example conversion of an interlaced video received by a display to a progressive video that can be drawn on the display. The interlaced video includes a plurality of fields that alternate between displaying even and odd fields of a frame. The interlaced video is de-interlaced using field combination techniques to combine successive even and an odd fields to create a single therefrom.

The 24-to-60 frame rate conversion used to transport movies over the NTSC broadcast television network typically involves a so-called 3:2 pull-down pattern. Initially each frame is converted into 2 identical fields (rather then an odd field and even field as done with interlaced scanning) so that the 24 frames are now 48 fields. Then a frame may be repeated an additional time every so often (transmitted as 3 successive fields) in order to convert 48 fields to 60 fields. For example, a first frame may be presented as 3 fields, a second frame may be presented as 2 fields and so on so that every 4 frames are transmitted as 10 fields. That is, a new frame has been added after each four frames.

Figure 2:
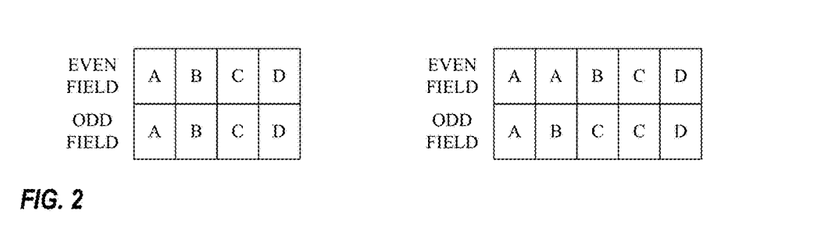
FIG. 2 illustrates an example 3:2 pull-down to convert 24 progressive frames (e.g., movie frames) to 60 fields for transmission by the television broadcast network.

FIG. 2 illustrates an example 3:2 pull-down pattern to convert 24 progressive frames (e.g., movie frames) to 60 fields for transmission by the television broadcast network. Initially, as illustrated to the left, each of four frames A, B, C, D are presented as an even and odd field to create 8 fields. As illustrated on the right, a first frame A is presented as three fields (even, odd, even), a second frame is presented as two fields (odd, even), a third frame C is presented as three fields (odd, even, odd), and a fourth frame D is presented as two fields (even, odd). The four frames have now been presented as 10 fields. Extrapolating would result in 24 frames being converted to 60 fields for delivery.

Figure 3:
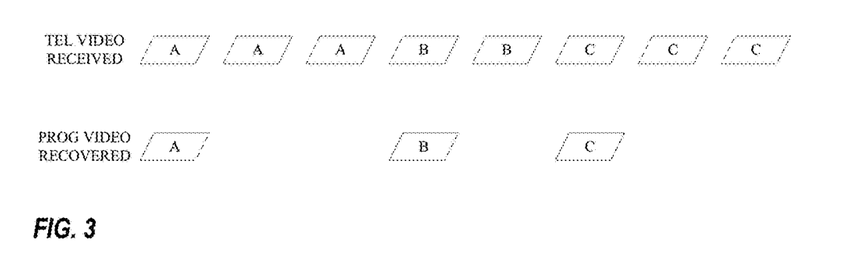
FIG. 3 illustrates an example conversion of telecine video received by a display to the original progressive video.

FIG. 3 illustrates an example conversion of telecine video received by a display to the original progressive video. The telecine video includes a plurality of frames where certain successive frames are the same. As illustrated, frame A is transmitted three times, followed by frame B two times, and so on based on the use of a 3:2 pull-down pattern. The recovered video keeps original frame A and discards the two repeated A frames, keeps the original B frame and discards the repeated B frame, and so on based on the pull-down pattern utilized.

The 3:2 pull-down is not the only format that may be utilized to transmit film movies or other 24 frame/sec videos at 60 field/sec over the television broadcast network. Some examples of other telecine pull-down patterns are: 2:2, 2:3:3:2, and 2:2:2:4. The different pull-down patterns may be based on editing and/or post processing (e.g., the addition of titles or other effects) performed on the video or may be based on the format/speed the video was captured. In addition, the displays may receive video from other sources including DVD players, digital video recorders or the like that were recorded, stored or transmitted at different telecine pull-down patterns.

Figure 4:
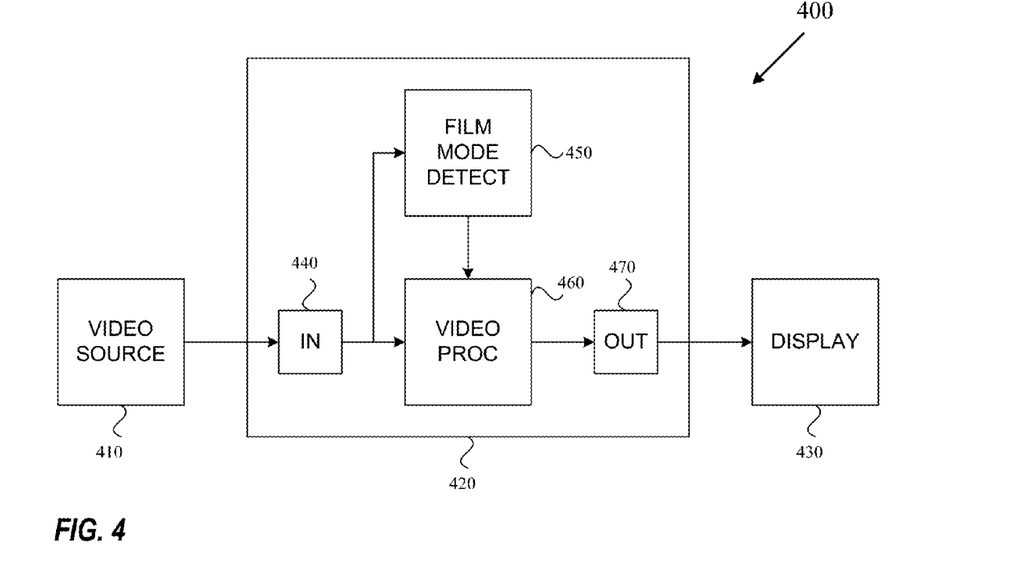
FIG. 4 illustrates an example video system, according to one embodiment.

FIG. 4 illustrates an example video system 400. The video system 400 includes a video source 410, a video display driver 420 and a display 430. The video source 410 may be local or may be remote. For example, a local video source may be a video player (e.g., DVD player), a video recorder (e.g., camcorder), or a computer. The remote video source may be, for example, a video broadcast system provided by cable, telephone or satellite providers (providing broadcast video and/or video on demand) or a server for downloading videos over a network. The video provided by the video source 410 may have various film modes (e.g., interlaced, telecine with various pull-down patterns) and the film mode may be different for different videos or may change within a video.

The video display driver 420 may be located within a television, computer, set top box, video player or the like. The video display driver 420 is to receive the video, determine the film mode of the video, and then convert the received video to an appropriate format for display based on the film mode detected. The display 430 may be a separate device or may be, for example, part of a television along with the video display driver 420. The display 430 may be, for example, a liquid crystal display (LCD) or a plasma display.

The video display driver 420 may include an input interface 440, a film mode detector 450, a video processor 460, and an output interface 470. The input interface 440 receives a video from the video source 410. It should be noted that the video display driver 420 (for example if included in a television) may be capable of receiving video from a plurality of video sources and a user may be able to select which video is to be displayed, for example, with a remote control device (not illustrated). The input interface 440 may provide the video to the film mode detector 450 and the video processor 460.

The film mode detector 450 may analyze the video and determine if the video is interlaced (even and odd fields) or progressive (complete frames). If the video is progressive the film mode detector 450 may determine the pull-down pattern utilized to convert the video from the format it was captured at (e.g., 24 frames/second for motion pictures) to the format it was broadcast or stored at (e.g., 60 fields/second for NTSC television format). The film mode detector 450 may identify the frames that it believes are original frames and those that are repeat frames (may be part of the pull-down pattern analysis). As the film mode may change without notice, the film mode detector 450 may continually be analyzing the received video to determine the current film mode. The operation of the film mode detector 450 will be discussed in more detail later.

The film mode detector 450 provides the detected film mode to the video processor 460. The video processor 460 processes the video received from the input 440 based on the detected film mode received from the film mode detector 450 to create a progressive scanning video for display. For example, if the film mode detector 450 determines that the video is interlaced, the video processor 460 may de-interlace the video. The video processor 460 may be configured with a defined de-interlacing algorithm or may include a plurality of algorithms with which to select from.

If the film mode detector 450 determines that the video is progressive and utilized a certain pull-down pattern (e.g., 3:2), the video processor 460 can utilize the pattern to recreate the original video by keeping or utilizing original frames while discarding or ignoring repeated frames (specifically the frames repeated extra times, such as the $3^{rd}$ successive transmission of a frame in a 3:2 pull-down pattern). In theory, the film mode detector 450 simply needs to identify a first original frame and the pull-down pattern and the video processor 460 can follow the pattern therefrom in order to recreate the original video.

The video processor 460 may subject the recovered video to a frame rate conversion in order to enhance perceived image quality. The video processor 460 may make interpolations between successive images (original frames) to further increase perceived image quality. An interpolation between an original frame and a repeat of that original frame (substantially identical frames) should preferably be avoided. The pull-down pattern and/or the identification of original frames and/or repeat frames provided by the film mode detector 450 should ensure interpolations between substantially identical frames is avoided and that each interpolation concerns two original frames or their respective copies.

The video processor 460 provides the progressive scanning video created from the input video based on input from the film mode detector 450 to the output interface 470. The output interface 470 provides a display driver signal to the display 430 in response to the created progressive scanning video. The output interface 470 may carry out various signal processing operations, such as, for example, amplification, level shifting, bias voltage generation, and synchronization.

It should be noted that the film mode detector 450 and the video processor 460 are illustrated as separate blocks to annotate the different functions. This is not intended to limit the film mode detector 450 and the video processor 460 functions to being performed by separate devices or to limit each of the functions to being performed by a single device. Rather, the film mode detector 450 and the video processor 460 functions may be performed together on one or more devices, separate on one or more devices, or some combination thereof. The functions may be performed by hardware, software or firmware.

For example, the video display driver 420 may include a processor (not separately illustrated) and processor readable storage media (not separately illustrated) having instructions stored therein that when executed by the processor cause the processor to perform the video processor 460 functions described above. The processor readable storage media may also have instructions stored therein that when executed by the processor cause the processor to perform the film mode detector 450 functions described above. Alternatively, the video display driver 420 may include another processor (not separately illustrated) to perform the film mode detector 450 functions described above when it executes the instructions stored in the processor readable storage media.

The film mode detector 450 may determine the film mode in any number of methods utilizing any number of algorithms. Typically, the methods entail some subset of measuring certain parameters for the received video, analyzing the measurements, storing a history of the measurements and/or results of the analysis, and analyzing the history.

Figure 5:
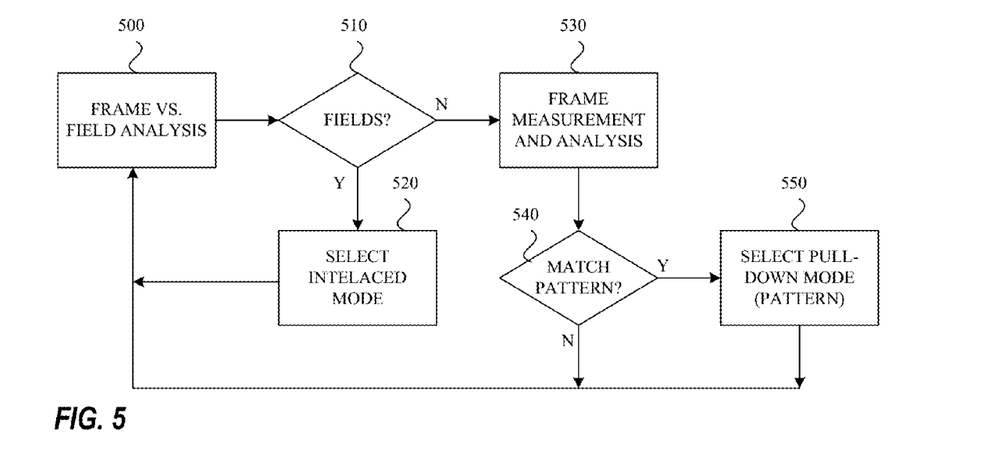
FIG. 5 illustrates a high level flow diagram of an example film mode detection process, according to one embodiment.

FIG. 5 illustrates a high level flow diagram of an example film mode detection process. When frames are received they are initially analyzed to determine if they contain data for the entire frame or only for the odd or even lines of the frame (fields) 500. A determination is made as to whether the frames are actually fields 510. If the determination is that the frames are fields (510 Yes), then an interlaced mode is selected and this mode is provided to the video processor to perform de-interlacing 520. The process then continues with the frame/field analysis for the next frame received 500. If the determination is that the frames are frames (510 No), then measurements are calculated for the frames and analysis is undertaken based thereon to determine the pull-down mode utilized 530. Examples of the measurements and analysis that may occur in order to determine the pull-down mode utilized will be discussed in more detail later.

A determination is made as to whether the measurements/analysis match a certain pull-down mode 540. If the determination is that a pull-down mode (e.g., 3:2 pattern) has been matched (540 Yes), then that pull-down mode (pattern) is selected as the mode and the selected mode is provided to the video processor to perform a reverse pull-down 550. The process then continues with the frame/field analysis for the next frame received 500. If the determination is that a pull-down mode has not been matched (540 No), then the process continues with the frame/field analysis for the next frame received 500.

Figure 6:
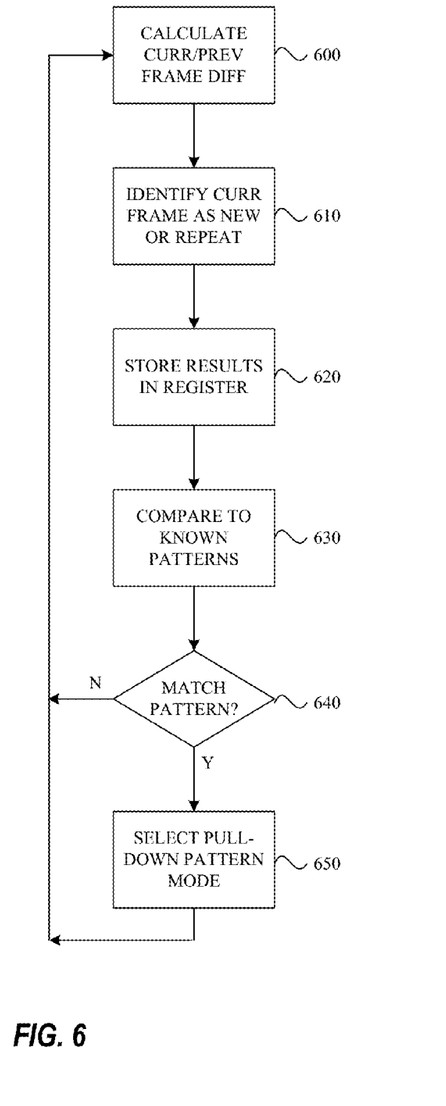
FIG. 6 illustrates a high level flow diagram of an example pull-down mode determination process, according to one embodiment.

FIG. 6 illustrates a high level flow diagram of an example pull-down mode determination process (e.g., measurements and analysis 530 of FIG. 5). Initially, received frames are compared to previous frames and the differences between the frames are calculated 600. Alternatively, the similarities may be calculated or some type of correlation value may be calculated. A determination is made as to whether the frame is a new frame or a repeat frame based on the differences calculated 610. For example, if the differences are below a certain threshold the image presented on the frame may be determined to be the same as a previous frame and thus may be classified as a repeat frame. Alternatively, if the differences are above a certain threshold it may be determined that the image is different and thus the frame is new.

The new/repeat frame identifications may be stored in a register 620. The new/repeat pattern captured in the register may be compared to new/repeat patterns for known pull-down modes 630. A determination is made as to whether there is a match to a certain pull-down mode 640. If the pattern captured matches a known pattern to some level of certainty (640 Yes), the associated pull-down mode may be selected as the film mode 650. For example, for a 3:2 pull-down mode the following frame order may be followed A, A, A, B, B, C, C, C, D, D so that the new/repeat pattern was new, repeat, repeat, new, repeat, new, repeat, repeat, new, repeat and so. If the pattern captured in register matched or was similar to this pattern this may be an indication that the pull-down mode was 3:2.

The comparison 630 may entail calculating some type of correlation value between the new/repeat identification pattern captured in the register and associated patterns for known pull-down modes. The number of frames considered in the comparison (e.g., correlation) may vary based on the pull-down mode. The determination 640 may select a mode if the correlation value for that mode exceeds a threshold (e.g., 95% correlation). According to one embodiment, the comparison 630 may include generation of a short term correlation (e.g., no more then 2 pattern sequences) and a long term correlation (e.g., 6 or more pattern sequences) and the determination 640 may select a mode if the short term, long term, or both correlations exceed defined thresholds.

After the mode is selected 650 it is provided to the video processor to perform a reverse pull-down. The process then continues with the difference calculation for the next frame 600. If there is no match (640 No), then the process also returns to 600.

Figure 7:
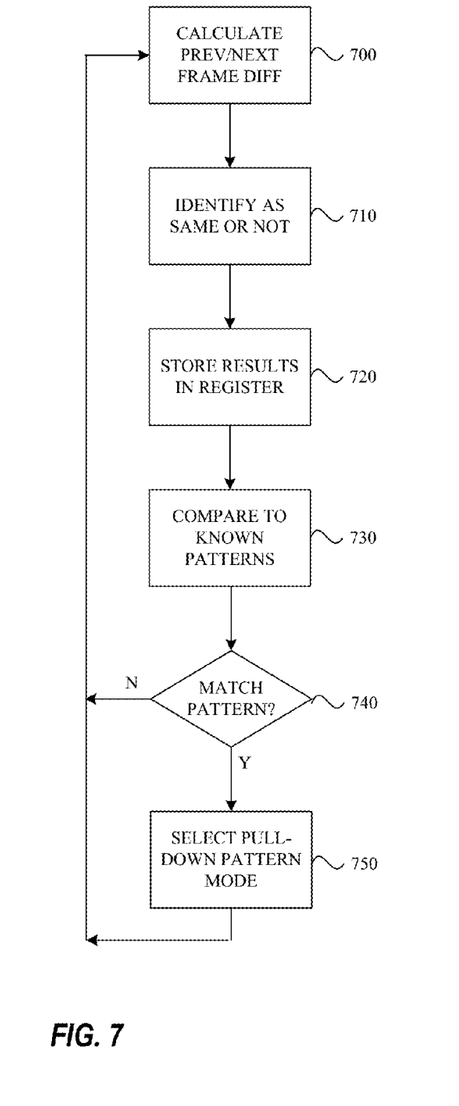
FIG. 7 illustrates a high level flow diagram of an example pull-down mode determination process, according to one embodiment.

FIG. 7 illustrates a high level flow diagram of another example pull-down mode determination process (e.g., measurements and analysis 530 of FIG. 5). Initially, for frames received a previous frame is compared to a next frame and the differences between the frames are calculated 700. Alternatively, the similarities may be calculated or some type of correlation value may be calculated. A determination is made as to whether the previous and next frame are the same or not based on the differences calculated 710. For example, if the differences are below a certain threshold the frames may be considered the same or if the differences are above a certain threshold they may be considered different.

The determination of whether the previous/next frames are the same may be stored in a register 720. The previous/next similarity pattern captured in the register may be compared to previous/next similarity patterns for known pull-down modes 730. For example, for the frame order A, A, A, B, B, C, C, C, D, D presented using the 3:2 pull-down mode, the previous/next similarity pattern may be different (no previous frame to compare), same, different, different, different, different, same, and different (no next frame to compare). A determination is made as to whether there is a match to a certain pull-down mode 740. If the previous/next similarity pattern captured matches a known pattern to some level of certainty (740 Yes), the associated pull-down mode may be selected as the film mode 750.

The comparison 730 may entail calculating some type of correlation value between the pattern captured in the register and associated patterns for known pull-down modes. The number of frames considered in the comparison (e.g., correlation) to known pull-down mode patterns may vary based on the pull-down mode. The determination 740 may select a mode if the correlation value for that mode exceeds a threshold (e.g., 95% correlation). According to one embodiment, the comparison 730 may include generation of multiple correlations and the determination 740 may select a mode if one, some combination, or all correlations exceed defined thresholds.

After the mode is selected 750 it is provided to the video processor to perform a reverse pull-down and the process then restarts 700 for the next frame. If there is no match (740 No), then the process also restarts 700 for the next frame.

Looking at the pattern for the 3:2 pull-down mode shows that for any 5 consecutive frames there should only be one previous/next match or for any six consecutive frames there should be one or two matches (two matches if the matches are in the first and last frame of the six consecutive frame sequence). Likewise other pull-down modes may have similar matching counts per a particular frame count. According to one embodiment, counters may be utilized to count the number the matches over a particular frame count and a comparison of the counters to known values may be done to determine an appropriate pull-down mode.

FIGS. 5-7 describe relatively simple examples of some methods that may be utilized to determine the film mode and are in no way intended to limit the film mode methods that may be utilized. These methods may include additional details that are not captured in these high level process flows. Other methods utilized may be much more complex, may calculate and analyze multiple measurements, and/or may compare several patterns in order to select a mode without departing from the scope. For example, the methods described with respect to FIGS. 6 and 7 could be combined in some fashion.

As illustrated in FIGS. 5-7, the determination of the film mode is typically based purely on the collected data and does not take the current film mode into account (algorithms are modeless). Not basing the algorithm on the current film mode may result in the film mode detector 450 having stability issues (e.g., switching modes when not required).

For example, a small amount of noise in the received video may result in one or more inaccurate measurements that may result in a determination of a new mode (a mode change) even though the video has not changed modes. Likewise noise in one or more measurements taken and/or recorded may result in an inaccurate mode change determination. Noise in a measurement that is captured in history may not be accounted for and may affect the analysis of the history and may result in an inaccurate mode change determination.

Referring back to FIG. 6, a small amount of noise in the calculation of the frame differences 600 may result in a new frame being classified as a repeat frame (or vice versa) 610. This results in a different pattern being captured in the registers 630 and may result in a match to a different film mode 650.

By way of another example, if the received video includes a static (or relatively static) image being presented for a period of time the analysis may not be able to determine what pull-down pattern is associated therewith (not match any know pull-down patterns) as the analysis may determine that the same frame is presented over and over. A correlation measurement for each known pull-down pattern may provide a close and possibly exact same measurement. In such cases, the film mode detector may opt to not perform any reverse pull-down or may select a default film mode pattern (which may not correlate to the current mode that is still viable).

Referring back to FIG. 7, if the video was relatively static for a period of time the calculation of differences between previous/next frames 700 and the determination/identification of whether they are the same or not 710 may result in a plurality of same determinations being stored in the register 730 which may not match any pattern 740 No. After some period of time where no mode (including the current mode) is detected, the film mode detector may opt to not perform any reverse pull-down and may just present the video received (including repeating frames). Alternatively, or at a later point in time, the film mode detector may select a default film mode that may be different then the current mode (which may still be accurate).

According to one embodiment, the film mode detector 450 may keep track of the current film mode. The film mode detection may proceed as before, and if a determination is made that a new film mode is being utilized the new film mode will be selected and provided to the video processor 460. In a case where the current measurements support selection of a few modes, a determination may be made as whether the current mode is supported and if so the current mode may be maintained. In a case where a mode can not be determined, for example based on the video presenting a static image for a period of time, the current mode may be maintained rather then switching to no mode, or a default mode. Such a configuration provides mode stability in the form of consistency in the selection of a mode when multiple modes or no modes may be in play for selection. However, the use of the current mode in this fashion does not account for the stability issue that may result when a small amount of noise captured in a measurement causes a change in mode selected.

According to one embodiment, the film mode detector 450 may utilize a current film mode in determining future modes. Until a mode is selected the methods for selecting the mode may stay the same (e.g., the methods described with respect to FIGS. 5-7). Once the mode has been selected the film mode detector 450 may switch to an operational mode that takes into account the current mode of the system (mode based operations). The mode based operations may predict a next measurement and then average the actual measurement with the predicted measurement to generate an average value as the final result. The averaged value may then be used to predict a next measurement. The mode based operations may improve measurement accuracy when a small amount of noise is captured. The mode based operations my be based on operational use of a Kalman filter to improve measurement accuracy in a noisy environment.

Figure 8:
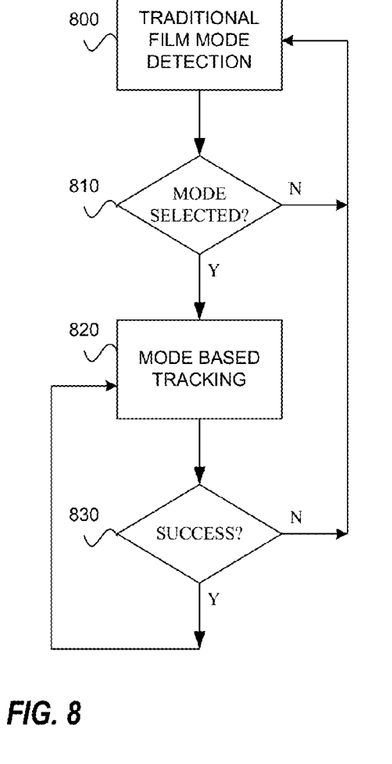
FIG. 8 illustrates a high level flow diagram of a mode based film mode detection process, according to one embodiment.

FIG. 8 illustrates a high level flow diagram of a mode based film mode detection process. Initially, for each frame that is received traditional film mode detection is utilized 800. The traditional film mode detection may include, for example, methods like those discussed with respect to FIGS. 5-7. A determination is made as to whether a film mode has been selected 810. If a mode has not yet been selected (810 No), then the traditional film mode detection methods are utilized 800. If a mode has been selected (810 Yes), then mode based tracking is initiated 820.

As noted above, mode based tracking may entail predicting measurements based on the mode and then averaging the predicted measurements with the actual measurements. The averaged measurement may be utilized to make future predictions. Use of the averaged measurement for analysis and further predictions may limit the effect of noisy measurements on mode selection. The mode based tracking 820 may predict results for one or more measurements to be taken in the film mode detection methodology utilized. The mode based tracking 820 may also define a range of acceptable values (or define out of range values) for one or more measurements to be taken in the film mode detection methodology utilized. Based on the measurements and analysis performed in the mode based tracking 820, a determination is made as to whether the mode based tracking is successful 830. Success may be based on the averaged measurements resulting in continued selection of the current mode or the measurements being within a defined acceptable range (or not in the defined out of range).

If the mode based tacking is considered successful (830 Yes), the mode based tracking 820 continues. If the mode based tacking is not considered successful (830 No), the process returns to the traditional film mode detection 800.

Figure 9:
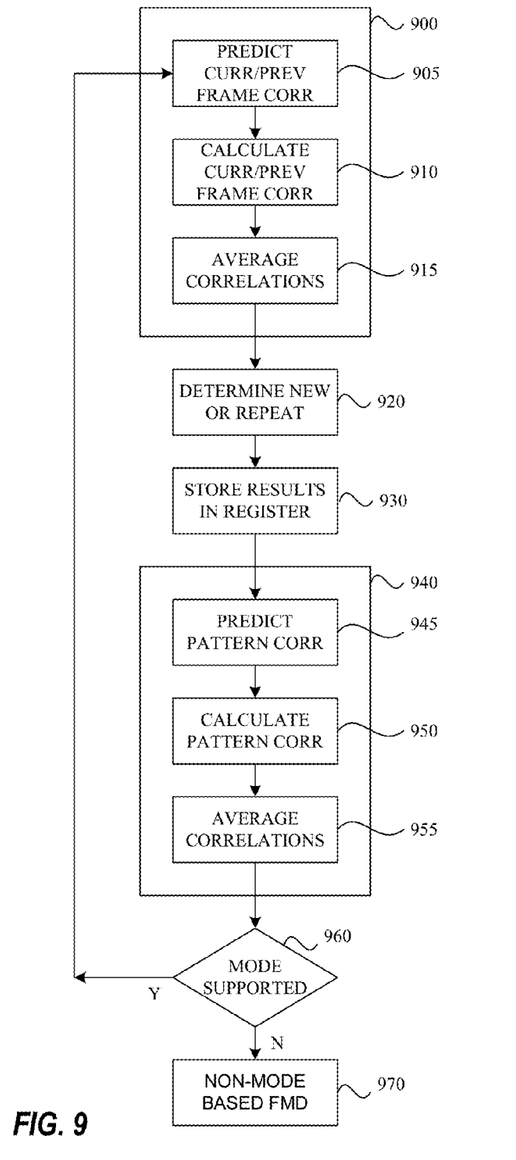
FIG. 9 illustrates a high level flow diagram of a mode based tracking process, according to one embodiment.

FIG. 9 illustrates a high level flow diagram of a mode based tracking process (e.g., 820 of FIG. 8). This process is similar to the process illustrated and discussed with respect to FIG. 6 (new/repeat frame patterns). Initially, a current frame is compared to a previous frame 900. In a methodology where mode was not considered this would simply entail calculating the differences (e.g., 600 of FIG. 6). In a mode based methodology, the comparison 900 includes predicting the correlation between the current and previous frames based on the pull-down mode selected 905, calculating the correlation 910 and averaging the predicted value and the measured/calculated value 915. A determination is made as to whether the frame is a new frame or a repeat frame based on the averaged correlation value 920.

Below is an example of how utilizing a prediction based on the pull-down mode selected may remove potential errors caused by noise in the measurements. Assume that a frame is determined to be a new frame if there is less than 90% correlation between it and a previous frame. Assume that noise in the correlation measurement of a repeating frame resulted in a correlation of 89%. This would result in the repeating frame being erroneously classified as a new frame. If the predicted correlation value was 97% (based on the fact that according to the pattern the frame would be a repeat frame) then the averaged correlation value would be 93% and the repeating frame would be accurately identified as such.

The new/repeat frame identifications may be stored in a register 930. The new/repeat frame pattern stored in the register is compared to the pattern associated with the selected pull-down mode 940. In a methodology where mode was not considered, the new/repeat pattern stored in the register would be compared to (correlated with) new/repeat patterns for known pull-down modes (e.g., 630 of FIG. 6). In the mode based tracking, the comparison 940 includes predicting a correlation between the stored pattern and a pattern associated with the selected pull-down mode 945, calculating the correlation 950, and averaging the predicted value and the measured/calculated value 955. A determination is then made as to whether the current mode is still supported based on the averaged correlation value 960 (e.g., is the averaged correlation above a defined threshold correlation). If the current mode is supported (960 Yes), the process returns to 900. If the current mode is not supported (960 No), the process returns to non mode based film mode detection 970 (e.g., 800 of FIG. 8).

Below is an example of how utilizing a prediction based on the pull-down mode selected may remove potential errors caused by noise in the measurements. Assume that the stored pattern is determined to match a pattern associated with current pull-down mode if there is at least a 90% correlation therebetween. Assume that noise in the correlation measurement resulted in a correlation of 89%. This would result in a determination that the current pull-down mode was no longer supported. If the predicted correlation value was 97% (based on the fact that the pattern was expected) then the averaged correlation value would be 93% and a determination that the current pull-down mode was supported would accurately be made.

By way of another example, assume that a repeating frame was erroneously classified as a new frame based on noise in the measurement. The erroneous classification may result in a lower pattern correlation value being calculated. As noted above, the predicted value could pull the averaged correlation value up so that an accurate determination was made.

The use of predicted values can be utilized with any film mode detection methodology to make the methodology mode based. Some or all of the measurements made within a particular methodology may be predicted.

Figure 10:
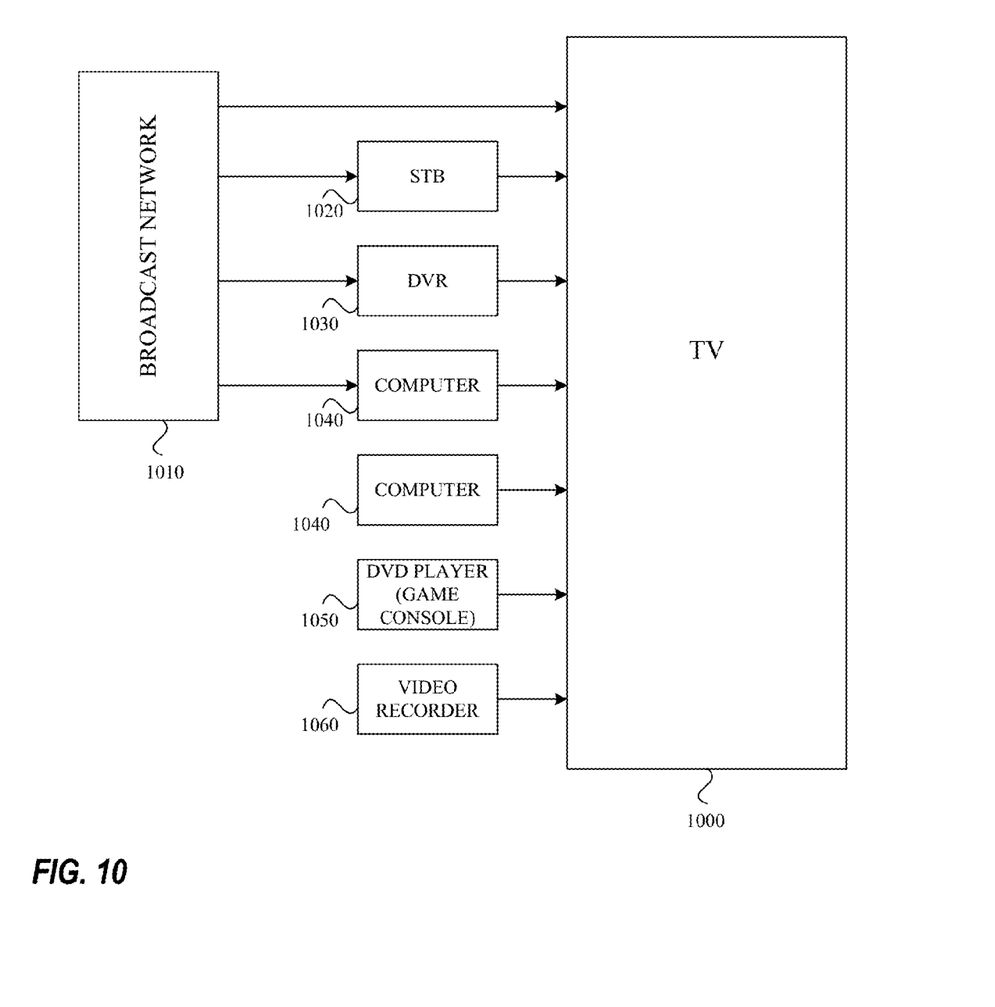
FIG. 10 illustrates an example video entertainment system where video content may be received from multiple sources, according to one embodiment.

FIG. 10 illustrates an example video entertainment system where video content may be received from multiple sources. The display device in this system is a TV 1000 which may be capable of receiving progressive scanning video, interlaced scanning video, or progressive scanning video transported or stored to a different rate using a telecine process having a particular pull-down pattern (telecine video). Accordingly, the TV 1000 may utilize mode based film mode detection to detect the film mode associated with the video and may modify the received video as required based on the film mode detected. While not illustrated the TV 1000 may include embedded circuitry capable of detecting the film mode and processing accordingly.

The TV 1000 may receive video from multiple sources. While not illustrated the TV 1000 may include a plurality of interfaces to receive video from the multiple sources via a plurality of mediums (e.g., cable, telephone, HDMI). For example, the TV 1000 may receive video from a broadcast network 1010. The TV 1000 may receive video directly from the broadcast network 1010 or via a set top box (STB) 1020, a digital video recorder (DVR) 1030, or computer 1040. If the STB 1020, DVR 1030, and/or computer 1040 receive interlaced and/or telecine video they may transmit it to the TV 1000 or they may utilize mode based film mode detection to detect the film mode associated with the video and create a progressive scanning video from the received video based on the film mode detected and provide the progressive scanning video to the TV 1000 for display. While not illustrated the STB 1020, DVR 1030, and/or computer 1040 may include embedded circuitry capable of detecting the film mode and processing accordingly.

The TV 1000 may also receive video directly from the computer 1040. The video may be video that was downloaded from another source, was created and/or edited thereon, or is being played thereon (e.g., a DVD) and routed to the TV. As noted above the computer may utilize mode based film mode detection.

The TV 1000 may also receive video from a DVD player 1050. As game consoles may have play DVDs they will be considered here as well. The DVD player 1050 may be capable of playing DVDs having progressive scan video stored thereon as well as DVDs having interlaced and/or telecine video stored thereon. The DVD player 1050 may transmit the interlaced and/or telecine video to the TV 1000 or may utilize mode based film mode detection to detect the film mode associated with the video and create a progressive scanning video from the received video based on the film mode detected and provide the progressive scanning video to the TV 1000 for display. While not illustrated the DVD player 1050 may include embedded circuitry capable of detecting the film mode and processing accordingly.

The TV 1000 may also receive video from a video recorder 1060. The video recorder may create and/or edit video at various cadences.

The various embodiments described above may incorporated in various electronic devices that provide video to a display, may be capable of providing video to a display, or may in the future be capable of providing video to a display, including, for example, a television, digital video disk (DVD) player, set top box (STB), digital video recorder (DVR), personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart television), mobile internet device (MID), messaging device, data communication device, and so forth.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed:

1. A method comprising:
    receiving a video from a video source;
    capturing data for the video;
    predicting data for the video based on a determination of a particular film mode for the video;

averaging the captured data and the predicted data; and comparing the averaged data to known parameters for the particular film mode to determine if the particular film mode is valid.

2. The method of claim 1, wherein the predicting, the averaging and the comparing are repeated if the particular film mode is determined to be valid.

3. The method of claim 1, wherein the particular film mode is determined to be valid if the averaged data meets or exceeds the known parameters.

4. The method of claim 1, wherein the particular film mode is determined to be valid if the averaged data and the known parameters meet or exceed a threshold correlation.

5. The method of claim 1, further comprising comparing the captured data to known parameters for a plurality of possible film modes until a determination is made that the video has the particular firm mode.

6. The method of claim 5, wherein the predicting, the averaging and the comparing the averaged data are performed subsequent to the determination of the particular film mode.

7. The method of claim 5, wherein the comparing the captured data to known parameters for a plurality of possible film modes is performed if the particular film mode is determined to be invalid.

8. The method of claim 1, further comprising processing the video based on the particular film mode.

9. A video display driver comprising:
an input interface to receive a video;
a film mode detector to:
    until a film mode is detected for the video, continually capturing data for the video and comparing the captured data to known parameters for a plurality of possible film modes; and
    once the film mode has been detected, continually capturing the data for the video, predicting data for the video based on the film mode, averaging the captured data and the predicted data, and comparing the averaged data to known parameters for the film mode to determine if the film mode is valid;
a video processor to process the video based on the film mode; and
an output interface to provide the processed video to a display.

10. The video display driver of claim 9, wherein the film mode detector may initially determine if the video is interlaced.

11. The video display driver of claim 9, wherein the film mode detector detects the film mode when a comparison between the captured data and the known parameters for the film mode meet or exceed a threshold.

12. The video display driver of claim 9, wherein the film mode detector is to calculate measurements for frames in the video and analyze the measurements, and wherein the captured data includes at least some subset of the measurements and the analysis.

13. The video display driver of claim 12, wherein the film mode detector is to predict at least some subset of the captured data.

14. The video display driver of claim 9, wherein the film mode detector determines the film mode is valid when a comparison between the averaged data and the known parameters for the film mode meet or exceed a threshold.

15. The video display driver of claim 9, wherein the film mode detector returns to continually capturing data for the video and comparing the captured data to the known parameters for the plurality of possible film modes if the film mode is determined to be invalid.

16. The video display driver of claim 15, wherein the film mode detector maintains the film mode until a new film mode is detected.

17. A video entertainment system comprising:
a video source to provide a video;
a film mode detector to:
    until a film mode is detected for the video, continually capturing data for the video and comparing the captured data to known parameters for a plurality of possible film modes; and
    once the film mode has been detected, continually capturing the data for the video, predicting data for the video based on the film mode, averaging the captured data and the predicted data, and comparing the averaged data to known parameters for the film mode to determine if the film mode is valid;
a video processor to process the video based on the film mode; and
a display device to display the processed video.

18. The video entertainment system of claim 17, wherein the display is a television and the television includes the film mode detector and the video processor.

19. The video entertainment system of claim 17, wherein the video source is a digital video recorder (DVR) and the DVR includes the film mode detector and the video processor.

20. The video entertainment system of claim 17, further comprising a set-top box (STB) between the video source and the display, wherein the STB includes the film mode detector and the video processor.

21. A non-transitory processor readable storage medium storing instructions, wherein when the instructions are executed by the processor they cause the processor to:
continually capture data for a video;
continually compare the captured data to known parameters for a plurality of possible film modes until a determination is made that the video is associated with a particular film mode; and
subsequent to the video being associated with the particular film mode, continually
    predict data for the video based on the particular film mode;
    average the captured data and the predicted data, and
    compare the averaged data to known parameters for the particular film mode until a determination is made that the video is no longer associated with the particular film mode.

22. The non-transitory processor readable storage medium of claim 21, wherein when executed by the processor the instructions further cause the processor to determine the video is associated with the particular film mode when a comparison between the captured data and the known parameters for the particular film mode meet or exceed a threshold.

23. The non-transitory processor readable storage medium of claim 21, wherein when executed by the processor the instructions further cause the processor to
calculate measurements for frames in the video; and
analyze the measurements, and wherein at least some subset of the measurements and the analysis are at least part of the data continually captured.

24. The non-transitory processor readable storage medium of claim 23, wherein when executed by the processor the instructions cause the processor to predict at least some subset of the measurements and the analysis that are part of the captured data.

25. The non-transitory processor readable storage medium of claim 21, wherein when executed by the processor the instructions further cause the processor to determine the video is no longer associated with the particular film mode when a comparison between the averaged data and the known parameters for the film mode fall below a threshold.

26. The non-transitory processor readable storage medium of claim 21, wherein when executed by the processor the instructions further cause the processor to process the video based on the particular film mode.

* * * * *